Dec. 19, 1950  M. JONES  2,534,824
GYROSCOPIC NAVIGATIONAL DEVICE
Filed July 9, 1947  5 Sheets-Sheet 1
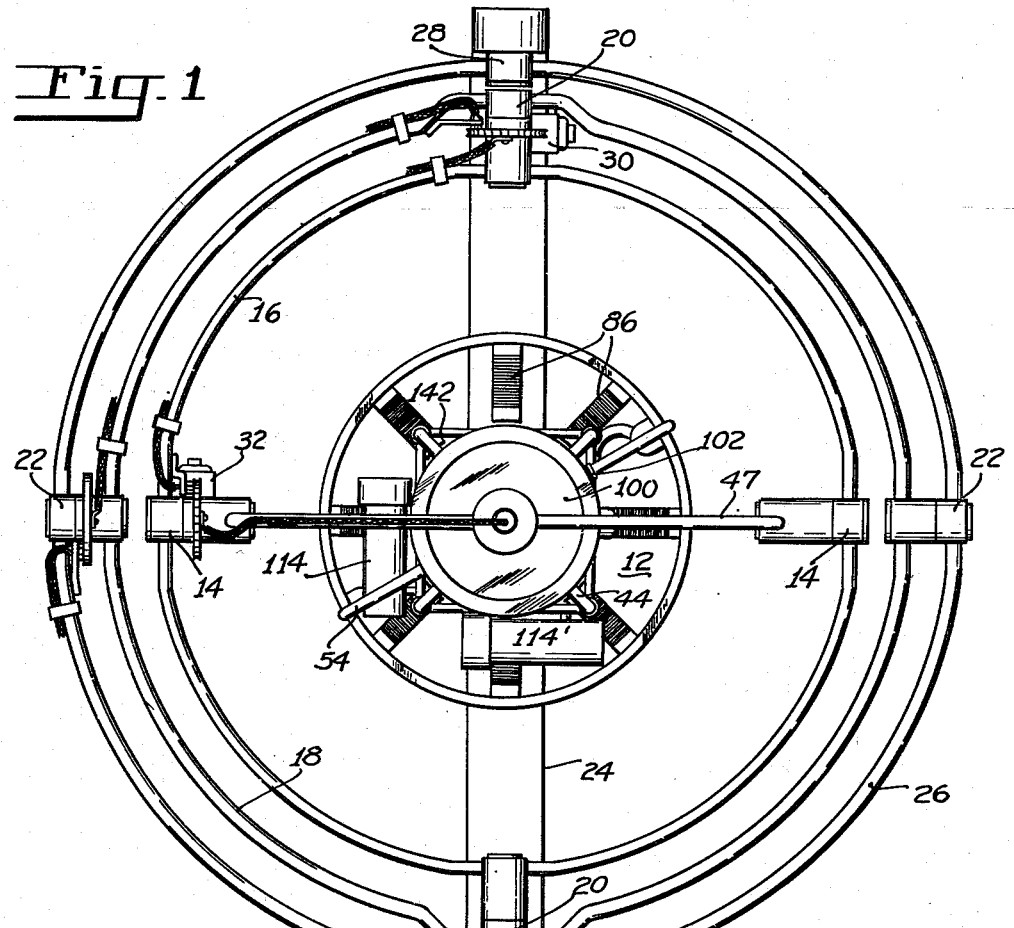
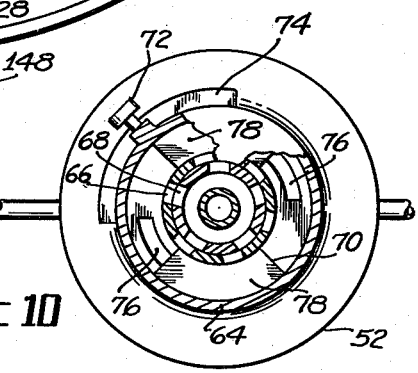
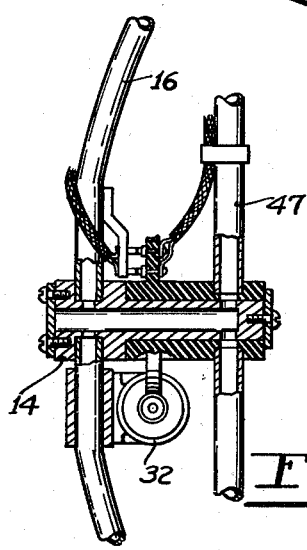
INVENTOR.
MEREDITH JONES
BY
Reynolds+Beach
ATTORNEYS Dec. 19, 1950     M. JONES     2,534,824
GYROSCOPIC NAVIGATIONAL DEVICE Filed July 9, 1947     5 Sheets-Sheet 2

INVENTOR.
MEREDITH JONES
BY Reynolds + Beach
ATTORNEYS

INVENTOR.
MEREDITH JONES
BY
*Reynolds & Beach*
ATTORNEYS

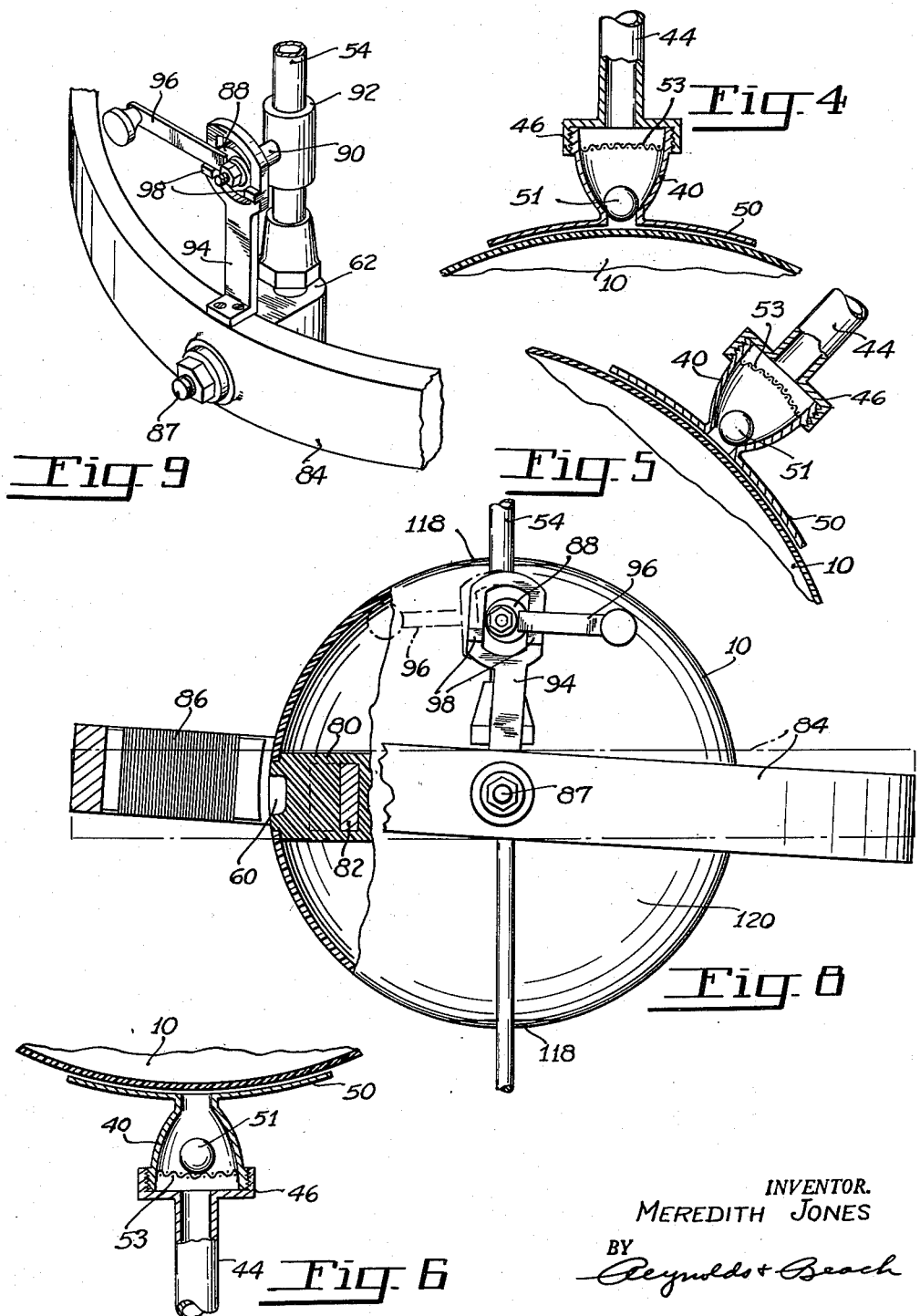

Dec. 19, 1950     M. JONES     2,534,824
GYROSCOPIC NAVIGATIONAL DEVICE
Filed July 9, 1947     5 Sheets-Sheet 5

INVENTOR.
MEREDITH JONES
BY
Reynolds + Beach
ATTORNEYS

Patented Dec. 19, 1950

2,534,824

UNITED STATES PATENT OFFICE 2,534,824

GYROSCOPIC NAVIGATIONAL DEVICE

Meredith Jones, Seattle, Wash.; Anna A. Jones, executrix of said Meredith Jones, deceased, assignor to Anna A. Jones Application July 9, 1947, Serial No. 759,848

22 Claims. (Cl. 74—5.6)

This invention concerns an improved gyroscopic device which is hereinafter illustrated in its preferred application, namely as a navigational aid, wherein it may operate to detect changes in its latitude and/or longitude as it is moved over the earth's surface and to control accordingly a positional indicator or course-plotting device in much the same manner as did my earlier gyroscopic device disclosed in United States Patent No. 2,393,473, issued January 22, 1946, and entitled Gyroscopic Navigational Device.

It is the general purpose of my new gyroscopic device to provide a gyroscopic element which in its operation will approximate more closely than does any former device known to me, the ideal condition of a rotationally unrestrained gyroscope which is caged in such manner that it may be altogether free of involuntary precessing forces tending to alter the spatial relationship of its rotational axis and thereby detract from its positional accuracy as a reference device. In the above-cited patent I have gone to some length to describe the manner in which my earlier gyroscopic device may be used to determine latitude and longitude for navigational purposes. In that description is a full discussion of the navigational geometry involved, of the manner of setting up the device and operating it in accordance with navigational requirements, and of the preferred manner of utilizing the navigational data afforded thereby as a means of controlling a positional indicator or other means responsive to such data.

In the interest of avoiding a labored repetition of much of the earlier description, I have deliberately presented herein my improved device in a form in which it is applicable to the same general problem of concern as my earlier device. Accordingly, I make liberal reference hereby to that patent for a general understanding of the navigational problem presently involved, for the general principles of operation of a gyroscopic device as applied to the solution of this problem, and thus of the preferred setting in which the present invention may be placed. In the main, the present description is consequently directed principally to the additional subject matter peculiar to my improved device, which distinguishes it from my earlier device and others.

It was pointed out in the cited patent that a universally free gyroscope is one which is capable of holding persistently its spatial relationship over an indefinitely protracted period, despite the fact that its casing may be required to undergo rotation relative to the rotational axis of the gyroscope element which it supports. Implicit in this definition is the condition that there be essentially no restraint or constraint on the gyroscopic element, by the casing or otherwise, which would cause it to precess involuntarily, and therefore that the means by which it is supported be frictionless.

To achieve these ends my earlier device employed a gyroscopic element in the form of a sphere housed within a spherical casing containing a liquid in which the gyroscopic sphere was immersed, with its buoyancy constituting a substantial means of its support. However, with that form of device it was necessary to lend additional mechanical support and guidance to the gyroscopic sphere, and also to provide electrical contact members engaging its surface for purposes there described. Consequently, while to a remarkable degree the gyroscopic sphere in that case was substantially unrestrained in any direction of its rotation relative to its casing, nevertheless the mechanical and electrical contacts in the form of ball bearings did inherently produce a certain amount of friction giving rise to restraints. These are eliminated in the present improved device.

With the gyroscopic element set into rapid rotation with its rotational axis fixed in a predetermined direction in relation to the diurnal rotational axis of the earth, as the gyroscopic device was transported over the earth's surface the angle between the rotational axis of the gyroscopic element and the plane horizontal with respect to the earth changed progressively with changes in latitude or longitude, depending upon the direction of such travel and the initial spatial orientation of the gyroscopic axis. It was pointed out and described, in that patent, how it is possible to resolve such angular changes into changes in latitude and longitude using a single gyroscopic device provided with suitable angle take-off and data-transmitting mechanism, or how separate devices could be utilized for the individual determination of latitude and longitude. The illustrated manner of detecting and utilizing angularity changes representing changes in the latitude and longitude of the device, was to suspend the casing pendulously from a horizontal element supported from a Cardan's suspension mount suitably oriented in compass bearing, and to cause the casing to follow the apparent angularity shift of the gyroscopic element by means of suitable follow-up mechanism controlled electrically by means comprising contacts carried by the casing and actuable by the shift in relative position of conductive contact strips laid in the surface of the gyroscopic sphere within the casing. It will be understood that my improved device may be similarly utilized and operated generally.

An object of my invention is to provide a gyroscopic navigational device incorporating a gyroscopic element which is freely rotatable universally relative to its support, and for this purpose is borne completely by gaseous fluid, such as by air, under pressure.

Another object is to provide a free-floating gyroscopic element supported directly and contacted solely by gaseous fluid directed in streams against the element, at all times counteracting in balanced manner the gravitational force acting on the element, to maintain such element in a central or neutral position in relation to its supporting means, irrespective of changes in inclination of the support relative to the direction of the force of gravity. Moreover, it is a related purpose to provide a fluid conduit arrangement and pressure distribution system including valves to control the force of the fluid streams directed against the element for the foregoing purpose, and for the additional purpose of producing fluid reactionary forces tending to offset the effect of shocks or accelerations on the device. Without such provision, considerable damage to the device and attendant operational inaccuracies may readily be incurred because of the inertia of the gyroscopic element when the supporting structure is jarred or accelerated.

A further object is to provide means by which angularity between the spin axis of the gyroscopic element and a selected axis of a supporting member, such as a sage or casing, may be detected and utilized to effect indication of such angularity or follow-up action of such supporting member, without mechanical contact or force interaction on the gyroscopic element tending to cause precession thereof with changes in such angularity. The follow-up movements or positions of the cage can then have no direct reactionary effect on the gyroscopic element and the cage isolates the element from exterior conditions. By thus enslaving the cage to the gyroscopic element without a reactionary effect on the element, the position of the cage relative to the horizontal may at all times be made accurately determinative of the latitude and/or longitude of the navigational position occupied, and may be utilized to actuate suitable course-tracing devices or indicators.

Inasmuch as the follow-up movements of the cage take place at an exceedingly slow rate frictional forces become magnified in importance, and without considerable attention paid to their elimination can be a source of considerable error. In view of the friction factors, the preferred practice of my earlier device, and which in principle I carry over into my present device, is to oscillate the cage at a steady, but relatively rapid, rate about its correct positions in relation to the gyroscopic element. The problem presented in effecting this is different in the present device since I have imposed the specification that there be no mechanical connection extending from the cage to the gyroscopic element.

A further object of the invention is to provide magnetic means for quickly positioning initially the gyroscopic element to orient its axis of rotation in space, or for precessing the element into a corrected spatial relationship during operation thereof. In this connection it is desirable to avoid residual magnetic fields after a correction has been effected which would impair the continuation of the correct positioning of the gyroscopic element, or would operate to retard it during its rotation.

As the description of the invention proceeds by reference to the accompanying drawings, the various features of the selected embodiment of the invention utilized to accomplish the foregoing will be presented.

Figure 1 is a plan view of my gyroscopic device, showing it mounted in a Cardan's suspension mount;

Figures 4, 5, and 6 are fragmentary views of an element of the fluid actuated supporting system in three typical operating positions.

Figure 7:
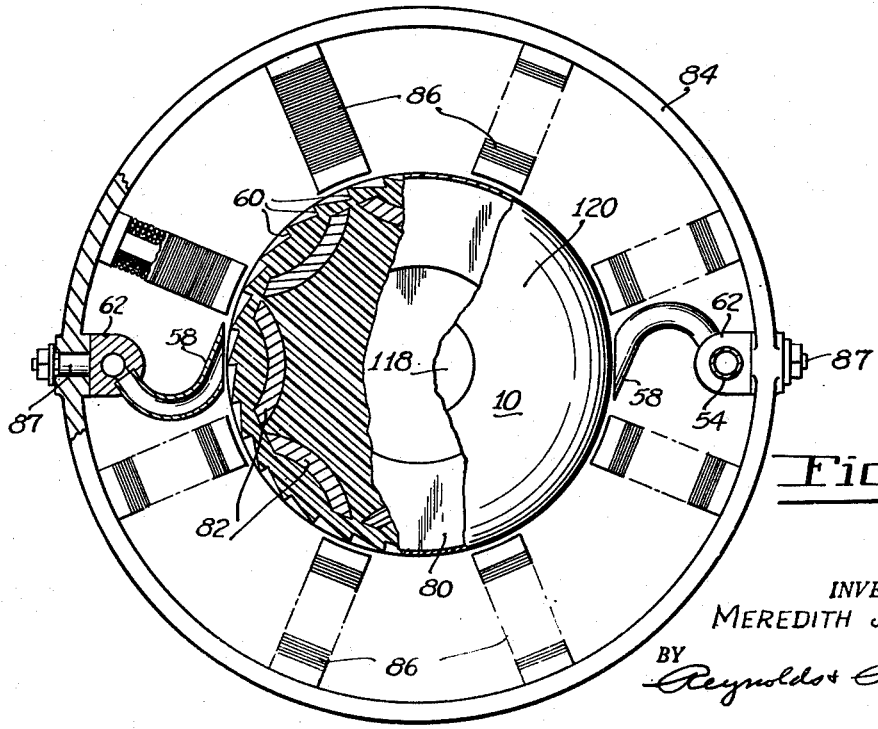

Figure 7 is a fragmentary plan view of the device, illustrating the electromagnet structure and the turbine arrangement for spinning the gyroscope.

Figure 8 is a fragmentary side view showing the mode of tilting the electromagnet structure for precessing the gyroscopic sphere, and Figure 9 is a perspective view illustrating the tilting mechanism.

Figure 10 is a fragmentary view showing the control valve in the fluid conduit system supplying fluid under pressure to the turbine jets.

Figure 11:
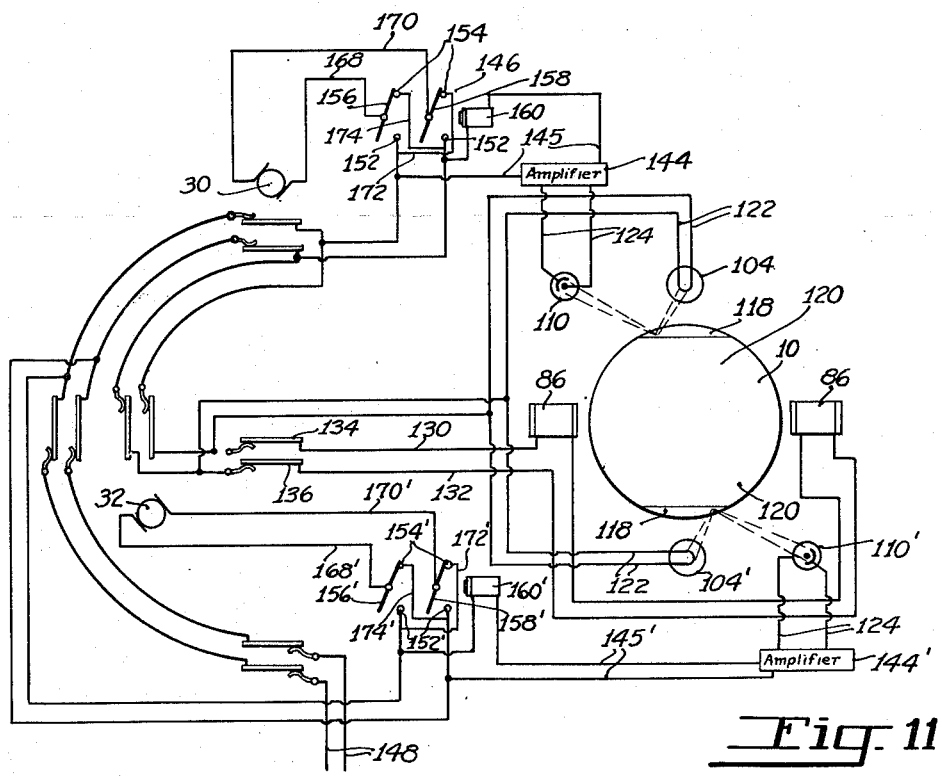
Figure 12:
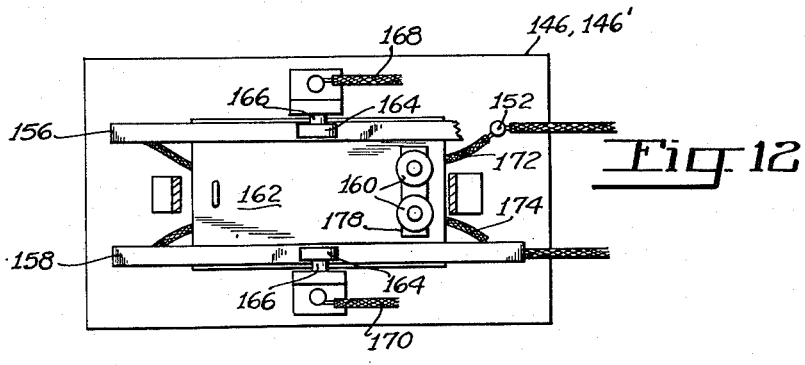
Figure 13:
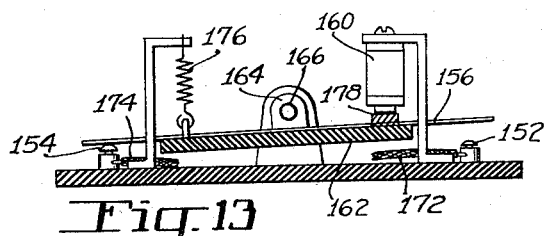

Figure 11 is a functional electromechanical diagram of the follow-up system by which the gyroscope cage is controlled, Figure 12 is a plan view of a double-throw double pole switch used in reversing the direction of a drive motor for rotating the cage about the center of the gyroscopic sphere, and Figure 13 is a side view in section of such a switch.

Figure 14 is a detail view illustrating the mechanical and electrical connections between the gyroscope cage and the gimbal ring from which it is supported.

In giving effect to the objects of my invention the gyroscopic element 10 which I employ is preferably spherical in form, as it was in my earlier device disclosed in Patent No. 2,393,473. The utility of a sphere is predicated largely upon its complete symmetry, because of which spacings and force balance may be accurately preserved between the sphere and its encompassing framework, despite rotative displacement of the sphere relative to such framework. The fluid pressure system which I employ for supporting the gyroscopic sphere 10 may comprise a plurality of jets or jet nozzles 40 forming part of the sphere-encompassing framework or cage. These jets are directed normally against the surface of the gyroscopic sphere and grouped symmetrically about it, such as at the corners of a cube which is concentric with the sphere, in which special case there will be eight jets or nozzles positioned mutually in quadrature about the surface of the sphere.

Each jet projects a stream of gas under pressure supplied through a separate valve of special design, and the mouth of the jet is located in the center of a cup 50 opening toward the sphere and which itself is concave, preferably being generally spherical in shape. The cup is spaced only a short distance from the surface of the gyroscopic sphere, providing a thin film of high-pressure fluid which produces the required supporting force for the sphere with relatively low pressure in the conduits leading to the jets. The gyroscopic sphere may thus assume any rotational position in the cage, and the cage may assume any position relative to the earth without impairing its mode of support. Separate valves control the supply of fluid to the individual jets, which are self-regulatory and together cooperate in effecting a perpetual balance of forces as long as the required pressure exists in the main fluid conduits, to maintain the sphere in central position between the cups despite its rotation and the direction in which the force of gravity acts on the sphere and cage.

The control valves 42 are connected in series with the several fluid conduit pipes 44 leading to the respective jets. Each valve body comprises a flanged fitting 46 formed at the inner end of a conduit 44 into which fitting is threaded a valve casing 40 formed integrally with the adjoining cup 50 and jet tube. Within the valve casing is a metal ball 51 which in one position is adapted to seat, by the action of gravity, against the valve port communicating with the jet passageway, at the vertex end of the tapered valve chamber. Seating of the valve occurs when the jet is directed downwardly, as a result of the gravitation of the ball 51 into its seated position in the entrance of the jet tube. However, when the jet and valve are inverted, with the fluid stream directed vertically upwardly, the valve ball 51 drops back from the nozzle port, where it rests on a supporting screen 53 disposed transversely across the valve chamber to prevent the valve ball from cutting off the supply of fluid to the nozzle when it is in the inverted position. In order that there may be a gradual shift toward closing or opening of the valve as its orientation shifts from one of the foregoing positions to the other, the valve chamber is formed as the vertex segment of a figure of revolution, such as a prolate spheroid or ellipsoid, the vertex end of which opens into the jet passageway. The precise geometrical configuration employed in any case will depend upon the size and weight of the ball and of the fluid pressure used, the principle being that the position assumed by the ball will be at the lowest horizontal tangential area of the chamber wall, depending upon the tilt angle of the valve. In Figure 4 the valve is shown closed, while in Figure 6 it is shown fully open. In Figure 5, representing the condition where the valve body is inclined at approximately 45° to the vertical, directed downwardly, the discharge nozzle is only partly closed by the valve, reducing the sustaining flow of gas correspondingly.

In the operation of the valves, the lower jets will be caused to direct forceful streams of gaseous fluid against the lower surface of the sphere to lend it support, whereas the upper jets will direct little, if any, fluid against the sphere, depending upon their orientation. In the event that the cage is rotated in such a direction relative to the earth's horizontal plane that a pair of opposing jets become aligned vertically to the earth's surface, the lower jet will carry the major load of the sphere 10, the upper jet will produce no downward force, and the six remaining jets lying in groups of three at two intermediate levels will produce stabilizing forces to centralize the sphere laterally. The forces produced by the lower group of three jets will act in an upwardly inclined direction and the upper group of three jets will produce counteracting downwardly inclined forces.

For cushioning the sphere 10 against sudden shocks, irrespective of its attitude relative to the cage, there will always be a film of air under pressure to take up the shock; and in the case of more appreciable shocks or accelerations applied to the cage, the valves themselves will become readjusted to the new conditions to alter the pressure distribution to preserve the neutrality of the sphere within the casing. Air friction between the sphere and the surfaces of the several cups, which is caused by the spinning of the gyroscope, is nugatory in setting up precessing forces on the sphere because all of the jets are directed toward the center of the sphere, which preferably is substantially coincident with its center of gravity, and are arranged symmetrically about that center.

Completing the structure of the cage 44, there is an outer tubular ring 47 serving as a fluid conduit and comprising the principal support of the cage. The ring trunnioned at 14 and the remaining parts of the cage which this ring supports within its compass are carried by the hollow pivot assemblies 48 and 50, defining a pivot axis within the cage. The pivot assembly 48 includes a double tubular member 50 in the flanged head of which is anchored the ends of the two sections of the supporting ring 47. Encircling the tube 50 at a position between its ends, a rotatable sleeve and hollow disc member 52 act to support one side of a framework 54 which carries an electromagnet sphere-positioning structure and turbine jets for driving the gyroscopic sphere, later to be described in further detail. The conduits 44, leading to the eight supporting jets in the casing are anchored in a hollow fitting 55 encircling and fixed to the end of the tube 50, where it acts as a thrust bearing for the hollow disk 52 and cooperates in the distribution to conduits 44 of gas under pressure supplied through the tubular ring 47 into the hollow of the tube 50, into a cavity within the fitting 54, through ports 56 in the walls of the tube 50, and from there through ports in the peripheral wall of the fitting. In this respect the pivot assembly 50' is similarly constructed, serving as a support for the opposite side of framework 54. All fluid transmitting joints and connections of the system are suitably sealed to carry the fluid to the jets without loss. Since the framework 54 is secured to the rotatable disc and sleeve member 52 at one end, and is secured similarly at its other end, the framework itself is hence rotatable relative to the support ring 47.

The gyroscopic sphere is spun about its principal axis by means of gas jets, such as air, directed tangentially against turbine buckets 60 encircling the sphere at its equator. For this purpose, two turbine jets 58 are provided, located at diametrically opposite points in the cage in order to preserve a balance of forces exerted on the sphere and to preserve a general balance in the weight distribution of the parts making up the device. The jet tubes are connected to the hollow fittings 62 which depend for support on the framework 54, the two branches of the upper half (Figure 2) of the framework 54 serving as parallel conduits individually supplying gas under pressure to the turbine jet tubes 58. The lower half of the framework 54 functions only structurally.

Figure 2:
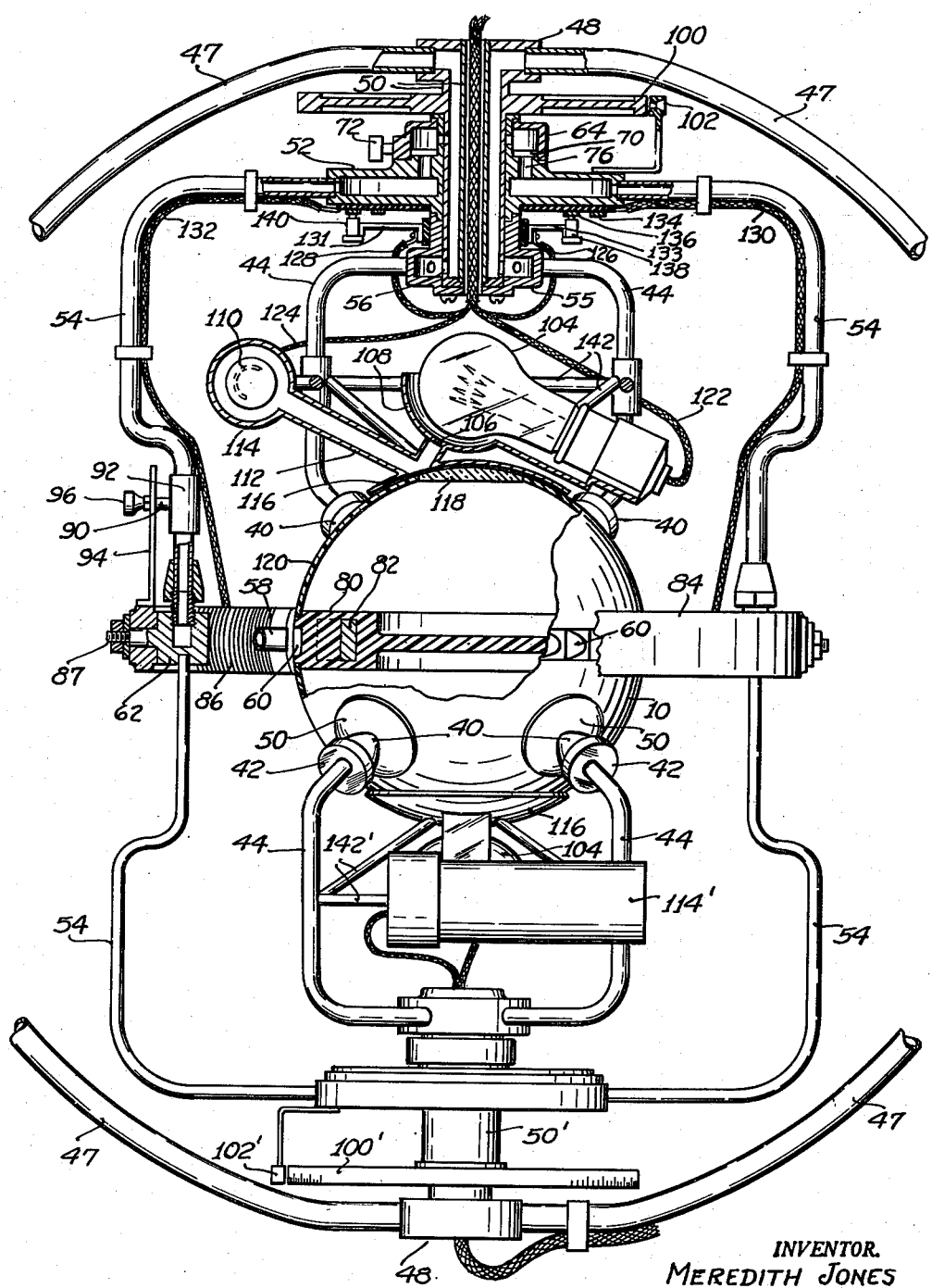
Figure 2 is a side elevation view of my gyroscopic device with parts broken away, no showing being made of the surrounding mount structure.
Figure 3:
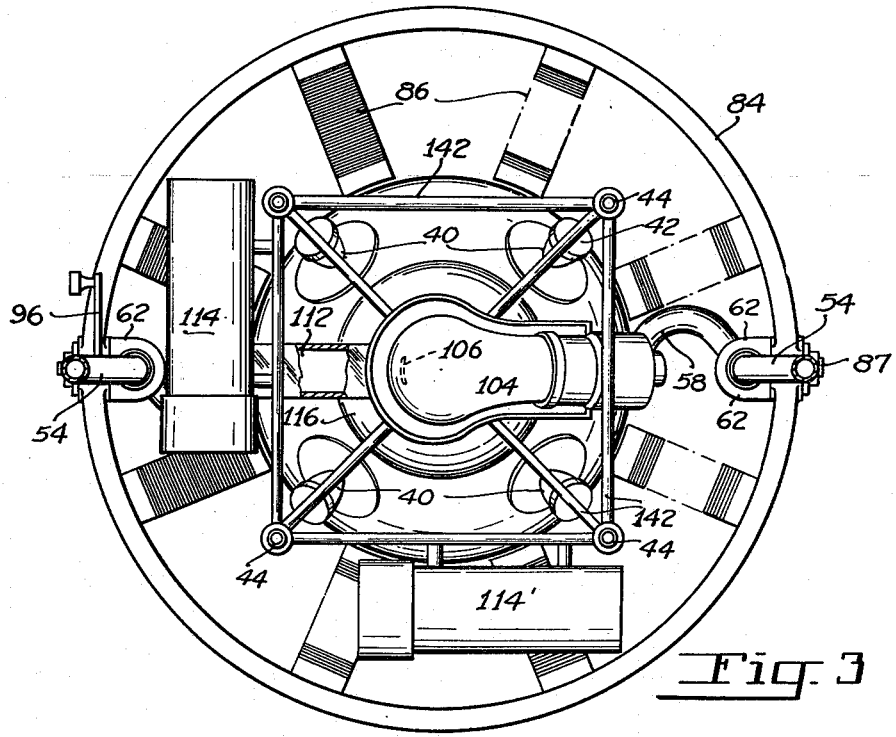
Figure 3 is a plan view of the same apparatus.

As a means of conveying the turbine gas from tube 50 to tube 54, as shown in Figure 2, in all relatively rotated positions of these tubes, while at the same time providing adequate structure interconnecting them, an annular distributing valve 64, shown best in Figure 10, is employed. This valve includes an inner wall snugly encircling the tube 50 and formed as a sleeve extension of the frame at disc 52, and an outer wall spaced radially outward from the inner wall. The inner wall of the valve has apertures 66 spaced equally about its circumference, and at a corresponding axial position tube 50 has apertures 68 extending through it, which also are spaced equally about its periphery, but at intervals different from the intervals at which apertures 66 are spaced. The spacing of these two series of ports is such that one or more port of the two groups will be in registry in all relatively rotated positions of the valve around tube 50. It will be noted that there are one more of port 66 than of ports 68, but there might be one less port 66 than there are ports 68 to afford communication between the interior of valve 64 and the interior of pipe 50 at all times.

The outer shell of the valve body 64 rests against one side of the disk 52 and may be rotated relative to the disk by swinging a handle 72 projecting from the side of the valve casing. The diametrically opposite valve outlet ports 70, which are formed in the end of the valve body abutting the wall of the disk 52 by quadrant plates 78, are registerable with the diametrically opposite arcuate slots 76 formed in such disk wall. Both the apertures 70 and 76 individually subtend angles slight less than 90° so that the ports may be opened and closed with the rotation of the valve casing. Also by adjustment of handle 72 the amount of fluid allowed to pass through the ports may be regulated, depending upon the extent to which the plates 78 cover the respective outlet ports 76. Once adjusted, the valve's position remains unchanged and the flow of fluid through the valve and into the conduits leading to the turbine jets unaltered, despite any rotation of the framework 54.

As a feature of my invention I employ a magnetic device for orienting or precessing the gyroscopic sphere. In the construction of the gyroscopic sphere 10, a cylindrical member 80 divides the sphere at its equatorial region forming three sections, as shown in Figures 7 and 8, the ring itself of substantial thickness being one section, and having two hollow spherical segments, one at each side of it. This ring constitutes the principal mass of the sphere as the gyroscopic element. The member 80 has a central disk and a weighted rim of nonmagnetic metal, embedded in the latter of which are a plurality of magnetic armature segments 82 lying in series in a concentric ring in the equatorial plane of the sphere just inside its periphery. The segments are of arcuate shape, bowed inwardly to form a plurality of short magnetic paths through the body of the rim, extending between successive points on the equator of the sphere. The jet buckets 60 are formed as recesses or serrations in the periphery of the rim as a matter of convenience in construction.

Cooperating with the armature segments in constituting a means of effecting control over the position of the sphere and of stopping it quickly when the driving force is removed, without need of mechanical connections, I provide a group of electromagnets 86, the same in number and angular spacing as the armature segments, carried by and projecting radially inwardly from a magnet supporting ring 84 mounted concentrically with the sphere in its equatorial plane. The inner ends of the electromagnets lie in close proximity to the periphery of the sphere. The supporting ring 84 is of ferromagnetic material, enabling it to act as a magnetic bridge between the ends of the individual magnets, thereby completing the several magnetic circuits which are formed upon energization of the magnets. When the sphere is not rotating, such circuits will individually include an armature segment and the two adjacent magnets, the segments being drawn magnetically into their closest relation to the magnets, as in Figure 7. In this position, the arcuate shape of the armature segments will be seen to approximate the path which an unconstrained magnetic field between adjacent magnets normally would follow if uninfluenced by the presence of the magnetic armature segments, and consequently the magnets exert a powerful force tending to hold the sphere 10 stationary relative to the casing. With the sphere in rotation the field configuration changes periodically as the armature segments move past the magnetic poles, thus constituting an effective magnetic brake if the current is strong. The armature segments and electromagnets are of an even number in order that the effects of residual fields reacting with the earth's field will mutually cancel and produce no precessing torque on the gyroscope.

Not only can the magnetic arrangement described be used to hold the sphere 10 stationary, or to stop it, but it can be operated to precess the gyroscope sphere while rotating. The electromagnet supporting ring 84 is supported from trunnions 87 projecting outwardly from the sides of the fittings 62, defining an axis of tilt of the supporting ring, which passes through the center of the gyroscopic sphere. In order to precess the gyroscopic sphere either while stationary or while rotating, an interaction is created of the primary magnetic fields of the electromagnets 86 and the secondary or induced fields of the armature segments. This interaction may be effected by tilting the plane of the magnets relative to the equatorial plane of the sphere and energizing the electromagnets while in that position.

Tilting the electromagnet structure relative to frame 54 may be effected in accurately determined amounts by an eccentrically-operated tilting mechanism of determined working stroke, shown in Figures 8 and 9 as including a lever-operated eccentric 88 which is carried rotatably at the end of a lateral supporting shaft 90, such shaft being secured to a fixed sleeve 92 encircling one branch of the framework 54 near its point of connection with the fitting 62. The eccentric 88 is located for rotation within a guide slot formed in the end of a swinging arm 94 fixed to the electromagnet supporting ring 84. Consequently, by swinging the eccentric lever 96 from its position against one of the stops 98 on the swinging arm 94 into engagement with the other stop, the arm 94 and the electromagnet structure may be tilted from a neutral position, in which the supporting ring 84 is parallel to the equatorial plane of the gyroscopic sphere, into a position inclined with respect to such plane.

The amount of tilt of magnet supporting ring 84 relative to frame 54 is determined by the throw or stroke of the eccentric 88 and the length of the arm 94, and either direction of tilt is obtainable by rotating the framework 54 through 180° relative to the gyroscope cage. It is therefore possible to precess the gyroscopic element in any direction simply by rotating the electromagnet structure into a position where the axis of trunnions 87 is perpendicular to the desired axis of precession, tilting the plane of the electromagnets, and energizing the electromagnets.

It will be noted that the amount of tilt of the magnet structure is limited, a fact which might at first reflection appear to limit the amount of voluntary precession which is possible in the system. However, such is not the case, because the casual magnet structure itself is constrained to follow the precessional movement of the gyroscopic element inasmuch as the cage as a whole follows such movement. The speed of precession is governed by the amount of force applied, which, of course, is directly related to the intensity of the current flowing through the magnet windings. This current should not be strong enough in any case to retard appreciably the rotation of the gyroscope sphere effected by the air turbine described above. The resulting interaction of the magnetic fields creates a torque tending to restore coincidence of the plane of the armature segments with that of the electromagnets, effecting a precessional movement of the gyroscope about an axis at right angles to the axis about which the torque is applied.

In initially properly orienting the gyroscope spin axis in relation to the cage, the electromagnets are energized to move the plane of the armature segments, defining the equatorial plane of the gyroscopic sphere, quickly from whatever position it may then be, into registry with the plane of the encircling electromagnets, which have been properly oriented in space. The magnetizing electric current may then be discontinued and the turbine started to rotate the gyroscope sphere 10. To make any final small correction which may be required, precession of the gyroscopic element during rotation of the sphere, may be effected by rotating the electromagnets to a selected position and then tilting their plane from the equatorial plane of the sphere, as described, whereupon slight energization of the electromagnets will create a torque applied to the spinning gyroscopic sphere, through the interaction of the principal magnet fields and the induced fields in the armature segments.

The resulting precession of the gyroscopic sphere will be about an axis which is at right angles to the meridian plane in which lies the axis about which the precessing torque is generated. Thus, if it is desired to alter the position of the spin axis of the gyroscopic sphere to correspond to its true position as indicated by astronomical observations or by other navigational methods, it is only necessary to rotate the supporting structure of the electromagnets so that the axis of its journals 86 will be in a position at right angles to the desired axis about which precession of the gyroscopic sphere is desired, to tilt the plane of the electromagnets, and then to energize them for a period sufficient to effect the necessary correcting precession.

In order to position accurately the tilt axis of the electromagnets to determine the direction which the voluntary precession may follow, I have provided an indicator ring 100 and coacting vernier scale indicator 102 to indicate the relative positions of the magnet tilt axis and of the cage. The indicator ring is fixed to the tubular member 50 concentrically of it and is marked in degrees of angle about its periphery, while the vernier indicator 102 incorporates a viewing window and is carried on an arm which rotates with the magnet structure. For convenience a similar indicator ring 100' and viewer 102' are provided at the opposite end of the cage, since the cage becomes inverted with every 180 degrees of travel of the device about the earth's surface.

During precession of the gyroscope to correct its position, the progress of correction may be viewed on either of the indicators described, and may thus be terminated manually at the correct point by cutting off the magnetizing current and returning the magnet ring to its normal position. If a single gyroscopic device is used both for longitude and latitude determinations for example, it may be appropriately precessed to correct its positioning in both senses at the same time by a single precessing movement, since the required precessions in both senses may be combined into a single resultant.

In order to allow the cage to follow universal rotational movements of the gyroscope's spin axis as the device is transported over the earth's surface, the cage 12 is mounted for rotation about an axis which normally passes through the center of the gyroscopic sphere in its equatorial plane, and the cage and its mount are in turn supported for rotation about an axis which is at an angle, preferably at right angles, to the axis of rotation just mentioned. In the illustrated form the cage 12 may be considered as taking the place of the casing 1 of my earlier device, it being supported rotatably by hollow trunnions 14 in the tubular gimbal ring 16. The latter is in turn supported from a horizontal gimbal ring 18, by hollow trunnions 20. The inner gimbal ring 16 carrying the gyroscope and its cage acts as a pendulum, for which purpose the rotational axis of the ring 16, defined by trunnions 20, is disposed in a plane lying below the pivot axis of the level ring 18. The pivot axis of the latter is determined by its supporting trunnions 22 which are carried by components of a Cardan's suspension system, comprising an upwardly opening yoke 24, and a gimbal ring 26 trunnioned at 28 on the upper ends of the yoke arms. All of the trunnions and gimbal rings have been made hollow for the passage of gaseous fluid to the gyroscope cage supporting nozzles and turbine described above from an externally located pressure system connected to a lead-in pipe 29.

Inasmuch as the yoke 24 will usually be supported in vertical position on the vessel or vehicle carrying the device, the gimbal rings 18 and 26 will tend to lie in the same horizontal plane when the vessel or vehicle is on an even keel. As the device is moved over the earth's surface, the gyroscopic rotation axis assumes a progressively different relationship to the horizontal plane of the earth, and assuming the gyroscopic rotation axis to have been set in perpendicular relation to the diurnal rotational aixs of the earth, as the device proceeds north or south from the equator the gyroscopic axis will move from a position perpendicular to the horizontal plane to one parallel to such plane, at the poles of the earth. The relationship of the gyroscope axis to the earth also changes through 90 degrees, such as between vertical and horizontal, as the device is moved in longitude over a quadrant of the earth's surface, if the gyroscope axis remains in a plane perpendicular to the earth's axis.

In order for the cage 12 to follow the progressive change in orientation of the horizontal plane relative to the gyroscope spin axis for changes in both longitude and latitude of the device, the gimbal ring 16 may be rotated about its trunnions 20 by a geared drive motor 30, and the gyroscope cage 12 may be rotated similarly about its supporting trunnions, within the gimbal ring 16, by a geared drive motor 32. One of the motors may be controlled by longitude variations and the other by latitude variations of the device, which are detectable by photoelectric means mounted within the cage and coact with the gyroscopic sphere. Such means will be described at an appropriate later point.

Thus, if it be assumed that the plane of the yoke 24 is oriented in an east-west direction, it follows that the geared motor 30 will cause follow-up rotation of the gimbal ring 16 and gyroscope cage in the sense of latitude, while the motor 32 will rotate the cage within the ring 16 with changes in longitude. As in my earlier case, suitable electrical take-off devices may be incorporated in the structure to detect angularity changes between the cage in its two directions of rotation with respect to the plane of the level gimbal ring 18, for application to a position indicator or other controlled device.

Having described generally the basic structural aspects of the gyroscope and its mounting, it is now opportune to proceed to the description of its automatic operation and of the photoelectrically controlled follow-up mechanism employed for that purpose. It is by this mechanism that the progressive latitude and/or longitude navigational data may be derived from the progressive apparent shift of the axis of rotation of the gyroscopic element, by causing corresponding movements of the gyroscope cage, and then detecting such movements for transmission to the indicating or course-tracing apparatus associated with the gyroscopic device.

In order to detect the positional alteration of the gyroscopic sphere in relation to the cage, I employ photoelectric devices carried by the cage and energizing light beams reflected from the gyroscope sphere. One of these beams is projected from a light source 104 through a small beam-defining arcuate slit 106 in a light source support and shield 108. The resulting narrow beam falls onto the surface of the sphere, by which it may be reflected onto the photosensitive element of a photoelectric cell 110. The path of direct and reflected light is enclosed in an angulated light-proof tube 112 which opens into a closure 114 surrounding and supporting the photoelectric cell 110. At its vertex the tube joins an apertured light shielding member 116 covering the polar area of the sphere and surrounding the region in which the light beam impinges the sphere. This light proof arrangement prevents interference with the operation of the device from external sources of light.

With the cage properly oriented in relation to the axis of rotation of the sphere 10, the point on the sphere at which the beam of light impinges will define an arc of a polar circle of predetermined radius, so that, as the sphere rotates about its axis, such light beam will trace that circle if the sphere is exactly centered within its cage in a predetermined reference relationship to it. In the construction of the sphere, this circle defines the boundary between light reflecting and non-reflecting areas on the sphere. The reflecting area may comprise the surface of a circular polar cap 118 or ring forming part of the spherical shell, the remaining general area of the hemisphere being light absorptive or non-reflective. When the light impinges the reflecting area, as the cage tilts out of its reference relationship to the rotating sphere 10, the photoelectric cell 110 is activated to a substantial degree by reflected light, whereas impingement of light on the non-reflecting surface 120 may be effective to produce only negligible activation of the photoelectric cell. By the increase or decrease in reflected light thus received by it the photoelectric cell is therefore capable of detecting whether the cage is tilted to one side or the other of its correct reference relationship with respect to the sphere's axis of rotation.

The gyroscopic sphere is similarly constructed for photoelectric tilt detection at its opposite end and coacts with a similar photoelectric device, the two photoelectric devices being positioned so that the median planes of the sphere passing through the respective points of impingement of the light beams on the sphere are mutually perpendicular in order that one device may detect latitude positional discrepancies of the cage from the reference relationship to the sphere while the other device may be responsive to longitude discrepancies from such reference relationship.

Each photoelectric device may be connected to control the operation of the corresponding latitude and longitude follow-up motor drive unit, tending to maintain the beams of light on the respective circular lines of demarcation between reflecting and nonreflecting surface areas of the gyroscopic sphere. While I may provide suitable electrical apparatus by which the position of the cage carrying the photoelectric devices will be substantially constant in relation to the sphere without hunting or oscillating about the position of correspondence, nevertheless it is preferred to produce a slight oscillation of the cage at a relatively high frequency in order to overcome the effects of friction in impeding the accurate follow-up of the cage relative to the sphere as the apparent angular position of the rotational axis of the sphere changes, caused by transportation of the device over the earth's surface and/or the diurnal rotation of the earth.

Such oscillation may readily be produced by controlling the sensitivity and damping factors of the electrical circuit through which the photoelectric cells are effective to operate the drive motors, so that the beams of light, and hence the cage, may be caused to undergo a complex, harmonic vibratory motion as the unit operates. Obviously, neither the general progressive movement of the cage nor its oscillation relative to the sphere react on the latter to cause its undesired precession, thereby eliminating any possible source of error that might have been present in my earlier device because of the presence there of electrical contacts physically engaging the surface of the sphere. The oscillation frequency of the cage is sufficiently high that it does not impair the operation of the pressure-control valves leading to the fluid jets which sustain the sphere.

Electrical leads 122 and 124 connecting the light source 104 and photoelectric cell 110 with their respective external circuits may be passed through the bore of the adjacent tubular member 50 along the axis of rotation of the magnet supporting structure. Electrical leads 126 and 128 for energizing the electromagnets connected in series, may also be introduced through the same channel. In order to accommodate rotation of the electromagnet structure with relation to the cage generally, a brush and slip ring assembly, comprising the slip rings 134 and 136 and their associated brushes 138 and 140, is employed. The brushes are carried by brush arms 131 and 133 connected by insulators to the hollow fitting 55, while the slip rings are mounted on an insulating plate secured to one side of the hollow disk 52, concentrically of the hollow tube 50. Leads 130 and 132 are connected to the respective slip rings leading to the magnet coils. The light source and photoelectric cell at the opposite end of the cage are similarly connected.

At each end of the cage, a suitable trusswork of cross and diagonal rods 142 interconnects the conduit pipes 44 and supports the lights 104 and 104' and photoelectric cells 110 and 110' from them, rigidifying this portion of the cage and insuring a fixed positional relationship between the two light beams and the axis of the cage.

With the activation of a photoelectric cell 110 when the corresponding reflecting cap 118 of the gyroscopic sphere enters the light beam, the electrical signal generated may be amplified in a suitable amplifier circuit, designated generally at 144 (Figure 11), and carried through leads 145 to actuate a relay type switch 146 which is operable to energize the geared motor 30 to effect such repositioning of the cage as will shift the beam of light from its position of impingement on the reflecting cap 118. When the beam of light is so removed, the photoelectric cell 110 becomes deactivated and the relay switch 146 deenergized. This relay switch, being of the double pole, double throw reversing type, is connected to the motor 30 to reverse its rotation with energization and deenergization of the relay of switch 146. Hence the motor 30 is operated in one direction or the other depending upon the location of the cage with the light beam reflected or absorbed by the surface of the gyroscopic sphere.

A similar effect occurs in the operation of the geared motor 32, the related circuit components which are the counterparts of the components just described being designated in Figure 11 with primed numbers. In that figure, the general schematic circuit diagram of the photoelectric control mechanism is shown in its relation to the geared drive motors 30 and 32, and also included is a lay-out of the slip ring and brush connections leading from an external power line 148, through the several rotary joints of the Cardan's suspension mount and gimbal rings, to the motors and to the photoelectric apparatus and electromagnet field coils. The arrangement of these connections as they appear pictorially in Figure 1 is carried into Figure 11. In Fig. 14 I show one such rotary joint, indicating the manner in which both air and electrical current traverse the joint. This might represent, for example, the joint at one of trunnions 14, also indicating the mounting of geared drive motor 32. The rings 47 and 16 have been made coplanar in the figure for convenience in illustration.

Suitable relay type reversing switches indicated by the numbers, 146, 146' appear in Figure 11 connected to control the motors 30 and 32 respectively. Since the switches may be similar, one is shown in detailed manner in Figures 12 and 13, comprising two pairs of contacts 152 and 154 engageable alternately by the switch bars 156 and 158, depending upon the energization or lack of energization of the switch relay coils 160. The switch bars are carried on a rockable insulating plate 162 in turn supported by brackets 164 which are free to rotate about supporting pins 166. The switch bars 156 and 158 may be connected through their respective supporting pins 166 and leads 168 and 170 to one or the other of the motors 30, 32 (Figure 11), and the switch terminals of the pairs 152 and 154 are cross-connected by conductors 172 and 174. The cross-connected terminals may be connected oppositely to a source of power to reverse the associated motor.

With the relay field coils 160 deenergized, a spring 176 tilts and maintains the switch bars 156 and 158 in position where they engage the contacts 152, energizing the motor for rotation in one direction. Upon energization of the relay field coil 160, however, a magnetic armature piece 178 connected to the insulating plate 162 is drawn upwardly, overcoming the force of the spring and causing the switch bars to break contact with terminals 152 and engage contacts 154, thereby reversing the direction of rotation of the motor. The amount of relay coil current necessary to accomplish this is fixed in accordance with the design of the switch, and by proper sensitivity adjustment of the amplifier controlling the relay switch, operation of the latter may be made critical at the point where the beam of light impinges an area on the sphere which area includes the line between reflecting and nonreflecting surface areas. Movement of the beam in either direction then causes operation of the motor in one direction or the other.

In order to minimize frictional effects impairing the accuracy of follow-up movement of the cage, the dynamic characteristics of the circuits and motor driven cage are designed to foster a slight instability or oscillation of the cage about its correct position in respect to both directions of its rotation about the center of the sphere, as mentioned previously. The natural frequency of vibration or oscillation of the cage about its correct position is centered in respect to such position, and the transmission mechanism for the cage tilt indicator, such as a Selsyn motor or transformer, may cause such indicator to respond only to the mean or average position of the cage, the oscillation effect being filtered from the signal which it receives. The frequency of oscillation may be altered in various known ways by changes in design affecting the natural period of the cage oscillations, such as by a change in the size or gear ratio of the geared motors 30 or 32 or in the sensitivity of the amplifier.

It may be noticed that there is a point in the positioning of the cage relative to its supporting ring 16, namely when the outer ring 47 of the cage becomes coplanar with the ring 16, in which position operation of the geared drive motor 30 becomes ineffective to reposition the cage properly in response to a positional discrepancy of the cage and gyroscope from their reference relationship, detected by its associated photoelectric control circuits connected to that motor. In this position of the cage, the effect of the motor 30 is to rotate the cage about the axis of rotation of the gyroscopic sphere and not to produce a relative angular movement. Consequently, while the position in which this occurs is relatively critical, I prefer nevertheless to avoid operating the device in a range including this position, but rather to so orient the yoke 24 of the Cardan's suspension mount in relation to the prospective course of travel over the earth's surface that this position will never be attained except for extremely long voyages, and in the latter case the device may be reoriented enroute if necessary.

Hence, in case of a prospective route to the northward I prefer to orient the yoke 24 in an east-west direction, whereupon extended travel over this route will result only in appreciable displacement of the ring 16 about its trunnions 20, with little displacement of the gyroscope cage within the ring 16. Similarly for the longitude gyroscopic device, if a separate one be employed, the orientation of its yoke would make possible avoiding the critical point of operation. In that case, where an appreciable change in longitude is expected during the course of travel, the yoke would be oriented in a north-south direction.

From the foregoing it will be apparent that the gyroscopic sphere itself contains no electrical circuit which must be connected to external circuits, and requires no mechanical connections for its complete operation, and that all effects derived from or produced on the sphere may be produced without disturbing its operational balance or symmetry. Consequently the spherical gyroscope is entirely free, and is not subjected to any extraneous forces which might cause precessing of the gyroscope to disturb the proper absolute spatial disposition of its spin axis, which consequently can be maintained accurately over an indefinite period.

I claim as my invention:

1. In a gyroscopic navigational device, the combination of a cage, pivot means supporting said cage, a gyroscopic element encompassed by and freely rotatable universally within said cage, and fluid jet means carried by said cage and operable to project fluid forcibly against said element to maintain it in a predetermined positional relation with respect to said cage in various rotative positions of said cage, said fluid jet means including a plurality of jet nozzles distributed universally symmetrically about said element and operable to project fluid jets against the surface of said element in such different directions and with such force in various rotative positions of said cage as to balance the force of gravity acting on said element in such various rotative positions, and to maintain said element in such positional relation with respect to said cage.

2. The combination of claim 5, in which the gyroscopic element is a sphere and the jet nozzles include spherical-segmental cups arranged substantially concentrically with said sphere, the force of the jets projected by the jet nozzles acting to maintain the adjacent portions of the sphere surface spaced therefrom by thin dynamic films of fluid, the predetermined positional relation of the spherical gyroscopic element thus being maintained with respect to said cups.

3. The combination in claim 2, in which the gyroscopic element is a sphere and the jet nozzles are eight in number, arranged in pairs at opposite ends of four diametral lines of said sphere, respectively, which lines form equal angles one to another, the force of the jet projected by the jet nozzles acting to maintain the adjacent portions of the sphere surface spaced therefrom by thin dynamic films of fluid, the predetermined position or relation of the spherical gyroscopic element thus being maintained with respect to said jet nozzles.

4. The combination of claim 2, and a gravity regulated valve associated with each of the jet nozzles and operable to control the supply of fluid thereto automatically in response to changes in the rotative position of said cage shifting the jet nozzle to alter its angularity relative to the horizontal, said valve effecting an increase in the supply of fluid to the jet nozzle as it is shifted to direct its jet in a more upward direction and effecting a decrease in the supply of fluid as the nozzle is shifted to direct its jet in a less upward direction.

5. In a gyroscopic navigational device, the combination of a cage, pivot means supporting said cage, means supporting said pivot means for turning in a plane including the axis of said pivot means, a gyroscopic element encompassed by and freely rotatable universally within said cage, and fluid jet means carried by said cage and operable to project fluid forcibly against said element to maintain it in a predetermined positional relation with respect to said cage in various rotative positions of said cage, said fluid jet means including a plurality of jet nozzles distributed symmetrically and universally about the center of gravity of said element and operable to project fluid jets against the surface of said element in such different directions and with such force in various rotative positions of said cage and of said pivot means as to balance the force of gravity acting on said element in such various rotative positions, and to maintain said element in such positional relation with respect to said cage.

6. In a gyroscopic navigational device, the combination of a tiltable cage, a gyroscopic sphere encompassed by said cage and floating unrestrainedly therein, a plurality of jet nozzles carried by said cage, adjacent to and distributed symmetrically about said sphere, directed convergently generally toward the center of said sphere, and operable to project fluid jets against the surface of said sphere, and fluid supply means operable to allocate fluid to said jet nozzles in amounts proportioned automatically among the jet nozzles in response to the attitude of tilt of said cage, to maintain said sphere in predetermined relation to said cage.

7. The combination defined in claim 6, in which the fluid supply means includes separate valves and conduits leading to the jet nozzles, gravity-operated control valves in said conduits, and means supporting the nozzles and said valves conjointly for equal movement of the valves with their corresponding nozzles as the cage tilts.

8. The combination defined in claim 7, in which each valve includes a tapered tubular valve casing disposed with its axis parallel to the axis of its corresponding jet nozzle, said casing forming an outlet port and a valve seat at its narrow end, and a ball valve freely movable within said casing and adapted to vary the opening seat by gravitational movement thereof when its jet nozzle is directed downwardly.

9. The combination defined in claim 8, in which the valve casing forms a valve chamber defining a segmental figure of revolution approximating the vertex segment of an ellipsoid, the valve seat and the outlet port being located in the vertex end of said chamber.

10. In a gyroscopic navigational device, a gyroscopic sphere, a plurality of jet nozzles adjacent to and distributed symmetrically about said sphere, and operable to project fluid jets against the surface of said sphere, said nozzles being directed convergently substantially toward the center of said sphere and being arranged in pairs directed oppositely, and fluid supply means connected to said nozzles and operable to supply fluid under pressure thereto individually in different amounts proportioned in accordance with the direction of the respective nozzles and supplying more fluid to jet nozzles directed upwardly toward said sphere than to jet nozzles directed downwardly toward said sphere to produce on said sphere a fluid supporting and stabilizing force maintaining it floating unrestrainedly in a predetermined position.

11. Acceleration-controlled, air-actuated mechanism for supporting a sphere, comprising a spherical-segmental cup disposed adjacent to the sphere, an air jet nozzle located centrally within said cup, and operable to project a jet of air against the surface of the sphere to form a thin film of dynamic air between the cup and the adjacent portion of the sphere surface, and acceleration-responsive valve means connected to said cup and operable to control the flow of air to said nozzle in response to acceleration forces applied thereto.

12. Mechanism as defined in claim 11, in which the valve means includes gravity plugs seatable by gravitational force to cut off the supply of fluid to its jet nozzle when such nozzle is directed vertically downwardly, fully unseatable by gravitational force when its nozzle is directed vertically upwardly, and partially seatable by gravitational force in progressively increasing degree as its nozzle is tilted progressively from an upward direction to a downward direction, correspondingly operable to cut off progressively the supply of air to its nozzle during such movement.

13. In a gyroscopic navigational device, a free floating gyroscopic sphere, a universally tiltable cage encompassing said sphere, fluid jet means carried by said cage and operable to project fluid against said sphere to support it with all portions of its surface spaced from said cage in all tilted positions of said cage, said fluid jet means being distributed in universally symmetrical relation about the center of gravity of said sphere, and drive means carried by said cage and operable to rotate said gyroscopic sphere relative to said cage in all tilted positions of said cage.

14. In a gyroscopic navigational device, a free floating gyroscopic sphere, a universally tiltable cage encompassing said sphere, fluid jet means carried by said cage in universally symmetrical relation about the center of gravity of said sphere and operable to project fluid against said sphere to support it with all portions of its surface spaced from said cage in all tilted positions of said cage, and fluid turbine means carried by said cage and operable to rotate said gyroscopic sphere relative to said cage in all tilted positions of said cage.

15. In a gyroscopic navigational device as defined in claim 14, the surface of the sphere having near one of its poles light reflecting and light absorbing areas divided by a small circle of the sphere, means operable to effect tilting of the cage, and control means operable to control the tilting of said cage effected by said tilt-effecting means including a light carried by said cage and operable to project a beam of light onto the sphere, and photoelectric means alternatively energizable and deenergizable by variation in the amount of light reflected from the light reflecting and light absorbing areas of the sphere respectively as the cage tilts relative to the sphere.

16. A gyroscopic navigational device, comprising a gyroscopic sphere, a cage encompassing said sphere and including a plurality of nozzles distributed universally about said sphere and operable to direct fluid jets against said sphere, and constituting the sole means acting to maintain it supported in position spaced from said cage, said sphere having light-reflecting and light-absorbing surface portions adjoining along a small circle of said sphere, light means carried by said cage and operable to project a beam of light onto the surface of said sphere, photoelectric control means carried by said cage and disposed to detect photoelectrically light of such beam reflected from the light-reflecting portion of the sphere's surface and energizable thereby to produce an appreciable electrical current, and electrically-controlled drive means energizable by such energization of said photoelectric control means, and operable, when thus energized, to shift said cage toward a predetermined relationship to the spin axis of said sphere.

17. In a gyroscopic navigational device, a gyroscopic sphere having light-reflecting and nonreflecting surface areas, fluid means including a plurality of fluid nozzles directed against said sphere and operable to support said sphere in a freely floating manner, means supporting said fluid means for free universal rotation in relation to said sphere, light means operable to project a beam of light onto said sphere, and photoelectrically-controlled drive means connected to the means supporting said fluid means and operable to determine the angular relationship between said fluid means and the rotational axis of said sphere, by light of said light means reflected from the surface of said sphere.

18. In a gyroscopic navigational device, a gyroscopic sphere, said sphere including a plurality of ferromagnetic armature segments arranged symmetrically in a circle concentrically of said sphere in its equatorial plane, a cage encompassing said sphere and including a plurality of electromagnets arranged symmetrically in a circle about said sphere and operable to magnetize said armature segments to apply torque to said sphere tending to align the equatorial plane of said sphere with the plane of said magnets, and to decelerate said sphere while it is spinning freely.

19. The device defined in claim 18, and supporting means carrying the electromagnets included in the cage, connected to said cage and tiltable in relation to the rotational axis of the sphere, and to its equatorial plane, said supporting means being rotatable about the axis of rotation of the sphere.

20. The device defined in claim 18, in which the armature segments and electromagnets are equal in number, which number is an even number.

21. In a gyroscopic navigational device, a gyroscopic sphere, a cage encompassing said sphere, fluid means carried by said cage and operable to float said sphere within and spaced from said cage, means operable to rotate said sphere gyroscopically relative to said cage, means operable normally to maintain said cage in substantially a predetermined relation to the rotative axis of said sphere, said sphere having a weighted member within its equatorial plane containing a plurality of ferromagnetic armature segments circularly arranged in said plane about the center of said sphere, an equal number of electromagnets encircling said sphere and disposed substantially coplanar, and supporting means for said electromagnets, carried by said cage and movable to tilt said electromagnets in relation to said cage to dispose their plane at an angle to the equatorial plane of said sphere, and to turn said electromagnets relative to said cage about the rotative axis of said sphere.

22. In a gyroscopic navigational device, a gyroscopic element having spherical surfaces distributed in universally symmetrical arrangement about the center of said element and with their respective centers of curvature located at such center, a cage encompassing said element, and a plurality of sets of fluid jets carried by said cage, each set including two jets located in positions diametrically opposite across said cage, said sets of fluid jets being distributed in universally symmetrical arrangement about said gyroscopic element at respective locations corresponding to said spherical surfaces, and automatically operable to project simultaneously upwardly directed fluid streams against any of such surfaces lying below the horizontal plane passing through the center of said element, and downwardly directed fluid streams against spherical surfaces lying above such plane, respectively, producing on said gyroscopic element such relative forces as to maintain said element substantially centered within said cage but entirely out of contact therewith while permitting universal rotational movement of said cage relative to said element about the center thereof.

MEREDITH JONES.

REFERENCES CITED

The following references are of record in the file of this patent:

UNITED STATES PATENTS

| Number | Name | Date |
| --- | --- | --- |
| Re. 20,701 | Gillmor | Apr. 19, 1938 |
| 1,390,471 | Sundhaussen | Sept. 13, 1921 |
| 1,589,039 | Anschutz-Kaempfje | June 15, 1926 |
| 1,972,882 | Gillmor | Sept. 11, 1934 |
| 1,986,807 | Gillmor | Jan. 8, 1935 |
| 1,999,646 | Wittkuhns | Apr. 30, 1935 |
| 2,086,896 | Carter | July 13, 1937 |
| 2,087,961 | Anscott | July 27, 1937 |
| 2,133,809 | Carter | Oct. 18, 1938 |
| 2,378,744 | Annen | June 19, 1945 |
| 2,393,473 | Jones | Jan. 22, 1946 |

Certificate of Correction

Patent No. 2,534,824                                                            December 19, 1950

MEREDITH JONES

It is hereby certified that error appears in the printed specification of the above numbered patent requiring correction as follows:

Column 15, line 50, for the claim reference numeral "5" read *1*; lines 60 and 72, respectively, for the claim reference numeral "2" read *1*;

and that the said Letters Patent should be read as corrected above, so that the same may conform to the record of the case in the Patent Office.

Signed and sealed this 27th day of March, A. D. 1951.

[SEAL]

THOMAS F. MURPHY,
*Assistant Commissioner of Patents.*